(12) United States Patent
Yonezawa et al.

(10) Patent No.: US 6,367,444 B1
(45) Date of Patent: Apr. 9, 2002

(54) CYLINDER HEAD FOR DIRECT INJECTED ENGINE

(75) Inventors: Minoru Yonezawa; Yuji Kinoshita, both of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/382,250

(22) Filed: Aug. 24, 1999

(30) Foreign Application Priority Data

Aug. 27, 1998 (JP) .......................... 10-241595

(51) Int. Cl.⁷ .................................................. F02B 3/00
(52) U.S. Cl. ...................................... 123/302; 123/301
(58) Field of Search ............................... 123/301, 302, 123/305, 308, 193.5, 432

(56) References Cited

U.S. PATENT DOCUMENTS

| | | | | |
|---|---|---|---|---|
| 5,115,774 A | * | 5/1992 | Momura et al. | 123/302 |
| 5,138,989 A | * | 8/1992 | Fraidl et al. | 123/302 |
| 5,259,348 A | * | 11/1993 | Kobayshi et al. | 123/302 |
| 5,309,879 A | * | 5/1994 | Regueiro | 123/302 |
| 5,709,190 A | * | 1/1998 | Suzuki | 123/302 |
| 5,816,215 A | * | 10/1998 | Yoshikawa et al. | 123/301 |
| 5,908,018 A | * | 6/1999 | Suzuki | 123/302 |
| 5,913,297 A | * | 6/1999 | Jingu | 123/308 |
| 5,943,993 A | * | 8/1999 | Carstensen et al. | 123/302 |
| 6,006,719 A | * | 12/1999 | Marsumura | 123/302 |
| 6,062,192 A | * | 5/2000 | Wirth et al. | 123/302 |
| 6,065,444 A | * | 5/2000 | Jingu et al. | 123/301 |
| 6,092,501 A | * | 7/2000 | Matayoshi et al. | 123/305 |
| 6,138,639 A | * | 10/2000 | Hiraya et al. | 123/302 |
| 6,173,693 B1 | * | 1/2001 | Landell et al. | 123/305 |
| 6,189,503 B1 | * | 2/2001 | Takano | 123/302 |

* cited by examiner

Primary Examiner—John Kwon
(74) Attorney, Agent, or Firm—Ernest A. Beutler

(57) ABSTRACT

A cylinder head arrangement for a direct injected internal combustion engine and particularly one having multiple valves. The cylinder head configuration is such that the injector can be positioned centrally in the combustion chamber and disposed below the overlying ports, which preferably are the inlet ports without significantly detracting from their flow area or without requiring sharp curvature or bends in their configuration that could restrict air flow.

7 Claims, 6 Drawing Sheets

CYLINDER HEAD FOR DIRECT INJECTED ENGINE

BACKGROUND OF THE INVENTION

This invention relates to a cylinder head for an internal combustion engine and more particularly to an improved cylinder head arrangement for a direct injected internal combustion engine.

In the interest of improving engine performance, both in terms of output and also improving fuel efficiency and exhaust emission control, direct cylinder injection offers a number of advantages. However, there is a distinct problem in connection with the positioning of the fuel injector so as to obtain the desired spray pattern in the combustion chamber and the desired relationship to the spark plug so as to ensure complete combustion within the combustion chamber.

The problems noted in the foregoing paragraph are particularly difficult when the engine employs multiple valves and associated intake passages that serve the valve seats. Specifically, it is difficult to position the fuel injector so that its spray pattern into the combustion chamber will offer either stratification and/or the formation of a homogeneous mixture under all or desired engine running conditions.

Also, the injector should be mounted in such a way that it will spray into the combustion chamber so as to minimize impact on the surfaces that define the combustion chamber. If the fuel impacts excessively on the combustion chamber surfaces, it may condense and not be completely burned during the combustion process.

It is also desirable to position the ignition plug at close to the geometric center of the combustion chamber, particularly at the top dead center condition. Unless this is done, then the flame propagation may be such that all portions of the fuel patch will not be burned during a particular combustion cycle.

Although multiple spark plugs can avoid some of these problems of incomplete combustion, they further complicate the cylinder head construction and thus are somewhat self-defeating in their nature.

It has been found that a particularly desirable location for the fuel injector, if a central spark plug is mounted in the cylinder head, is at a side of the cylinder head so that it injects toward the cylinder bore axis. Also if the injector is positioned away from the exhaust passages it will not be excessively heated. Generally, this dictates a positioning of the fuel injector in proximity to the intake ports that serve the combustion chamber and the passages associated therewith.

If the fuel injector is mounted so that it extends at an acute angle to the plane of the cylinder head surface that mates with the cylinder block to form the combustion chambers, the spray pattern can be directed generally downwardly toward the center of the cylinder bore axis and this will achieve many of the results desired. However, this places the fuel injector in a position where it will extend through the area where the intake or exhaust passages lie.

This interference with the intake and exhaust passages in the cylinder head results in the necessity for reshaping the passages and/or substantially reducing their flow area. In addition, this causes the tip of the fuel injector, which mates with the fuel rail for fuel supply, to be positioned in close proximity to the valve actuating mechanism. This is quite undesirable and can result in very complicated cylinder head arrangements.

Therefore, it has been proposed to mount the fuel injector so that it lies below the cylinder head passages and at an acute angle to the sealing surface of the cylinder head. In order to accomplish this, the associates passages are formed with a rather steep curvature so as to accommodate a central positioning of the fuel injector.

This is particularly true when there are a pair of intake passages or a Siamese intake passage that serves a pair of ports in the cylinder head on the side where the fuel injector is positioned. In such a situation, these passages are generally curved at a rather steep angle from the valve seats in a generally upward direction in order to clear the fuel injector. This gives rise to an effective reduction in the flow area and a flow restriction from the passages.

Furthermore, if the passages are intake passages, this curvature and their configuration may result in a flow pattern into the combustion chamber that is undesirable. Although some types of motion are desirable in connection with the inducted air, the particular flow pattern that will result from this upward curvature of the intake passages is not one that is particularly advantageous.

It is, therefore, a principal object of this invention to provide an improved cylinder head construction for an internal combustion engine that employs direct cylinder injection.

It is a further object of this invention to provide a cylinder head construction for an internal combustion engine wherein a fuel injector may be mounted below the intake passages toward the sealing surface of the cylinder head without requiring sharp curvatures in the passages that serve the adjacent valve ports.

It is a further object of this invention to provide a cylinder head construction having direct fuel injection wherein the fuel injector is juxtaposed to the intake passages, is positioned generally on a center side of the combustion chamber and the cylinder head intake passages are configured so as to have minimum curvature. That curvature that does exist is in the direction to give a swirling motion to the intake charge.

SUMMARY OF THE INVENTION

This invention is adapted to be embodied in a cylinder head for a direct injected internal combustion engine. The cylinder head has a sealing surface that is adapted to be held in sealing engagement with a cylinder block. Thus the cylinder head defines with a cylinder bore in that cylinder block a combustion chamber. A portion of the cylinder head sealing surface overlies the cylinder bore and defines at least a pair of valve seats on opposite sides of a first plane that extends through the center of the cylinder bore axis. Passages are formed in the cylinder head and extend from openings in outer side surfaces thereof to the respective valve seats. A fuel injector receiving opening is formed in one side of the cylinder head and opens through one of the side surfaces and terminates in a discharge nozzle opening that communicates with the cylinder head combustion chamber surface on a second plane that is perpendicular to the first plane and which also contains the cylinder bore axis. This fuel injector receiving opening is disposed beneath the passage at the one side of the cylinder head. That passage has an inlet opening in the outer surface and this inlet opening has a center lying substantially on the second plane and the passage is inclined at an acute angle to this second plane to its termination at the valve seat so that the injector opening is cleared without requiring sharp curvatures or substantial reduction in the flow area of the passage.

DETAILED DESCRIPTION OF THE PREFERRED EMBODIMENT

Figure 1:
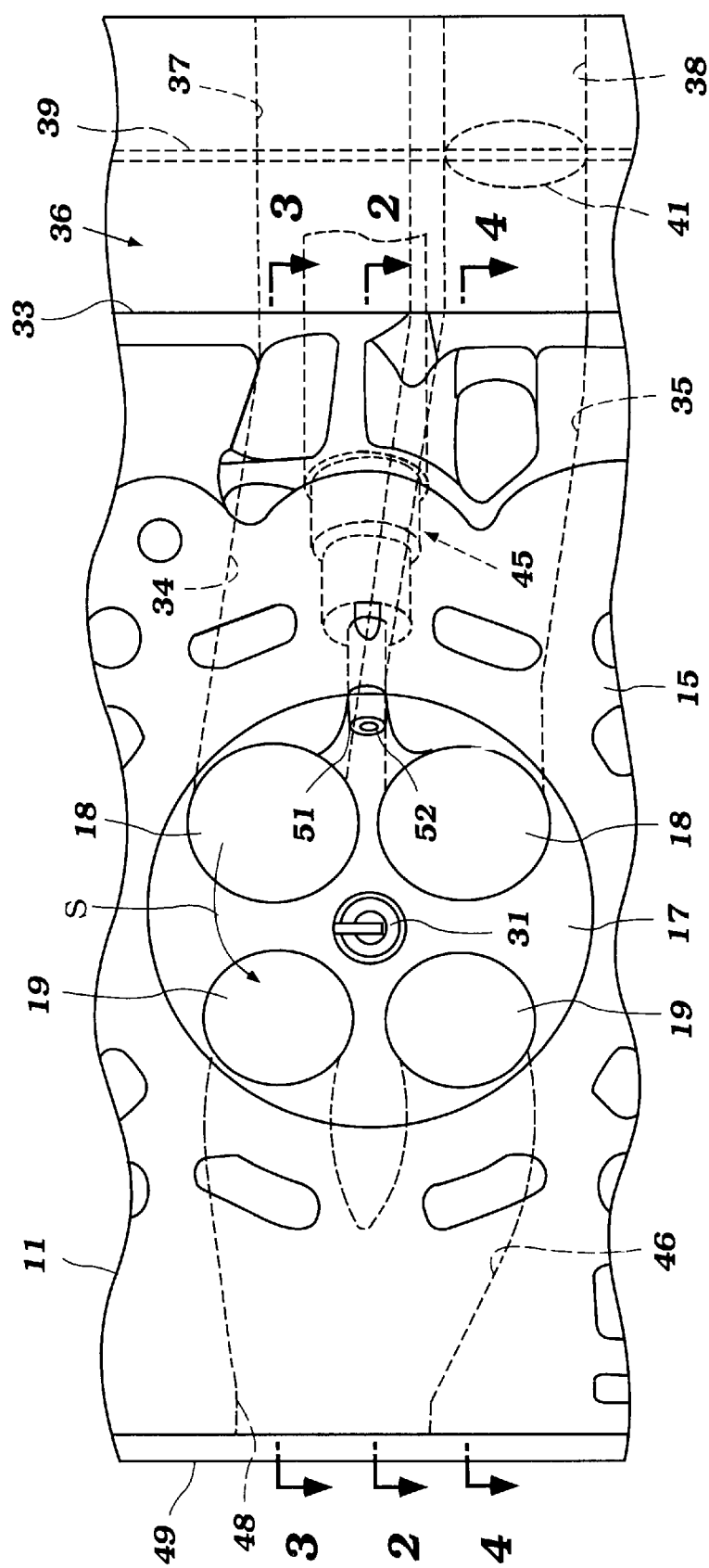
FIG. 1 is a partial, bottom plan view of the lower cylinder block sealing surface of a cylinder head of an internal combustion engine constructed in accordance with an embodiment of the invention and showing primarily only the relationship associated with a single cylinder bore of the engine.
Figure 2:
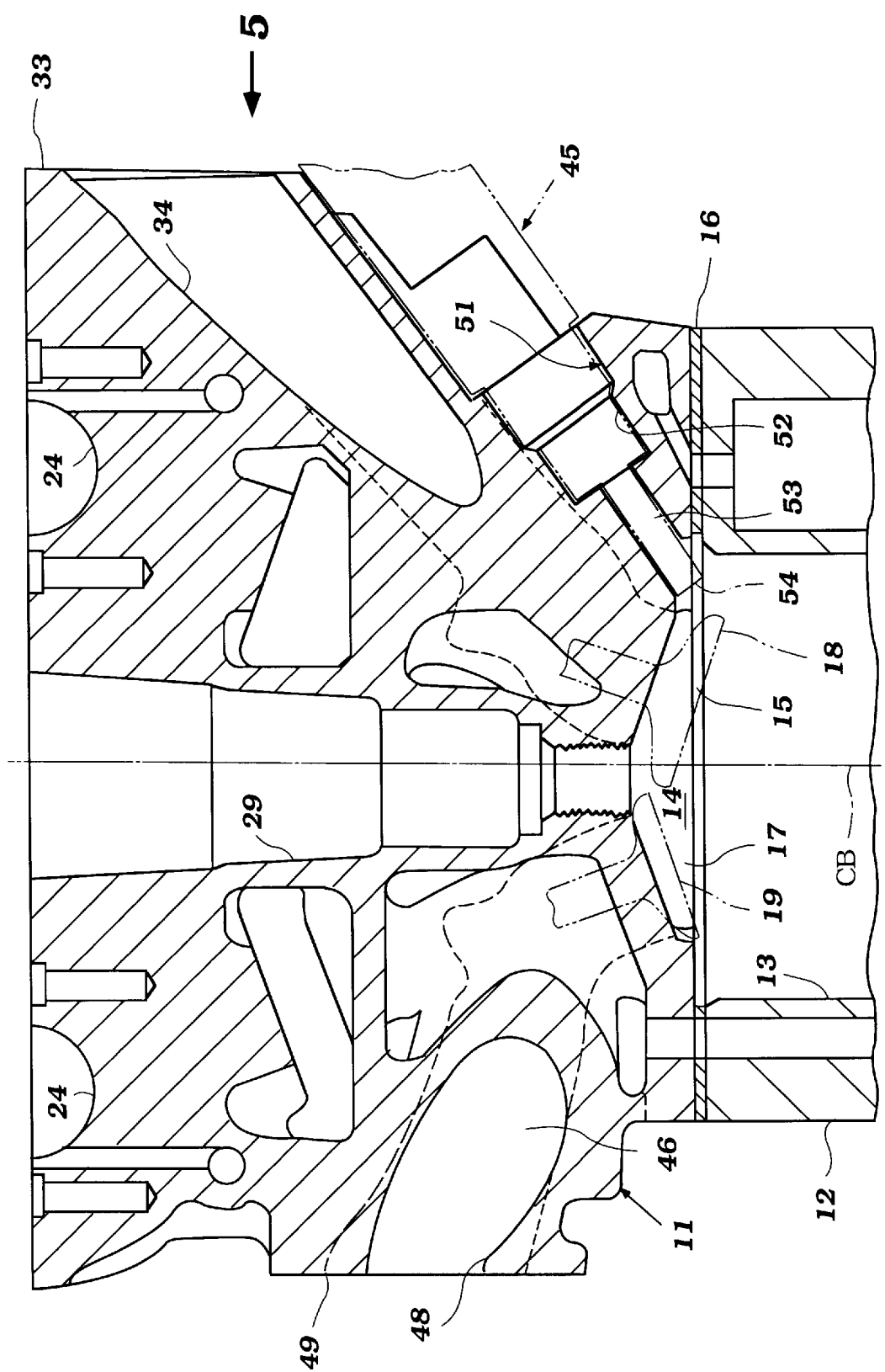
FIG. 2 is a cross-sectional view, taken along the line 2—2 of FIG. 1 and passes through the center of the cylinder bore axis along a plane that is perpendicular to a plane that contains the rotational axis of the crankshaft of the engine.

Referring now in detail to the drawings and initially primarily to FIGS. 1–5, a cylinder head of an internal combustion engine constructed in accordance with an embodiment of the invention is identified generally by the reference numeral 11. In the illustrated embodiment, the cylinder head 11 is adapted to cooperate with an associated cylinder block 12, which is shown only in FIGS. 2–4 and specifically with individual cylinder bores 13 thereof so as to form combustion chambers 14.

FIG. 1 only shows one of these combustion chambers because it will be readily apparent to those skilled in the art how the invention may be employed with engines having varying cylinder numbers and cylinder placement. As will be seen from FIG. 5, the illustrated cylinder head 11 is that associated with a cylinder block that has four cylinder bores 13. Of course, the invention can be utilized with any number of cylinders and also can be employed with V-type engines wherein the cylinder head 11 forms in part one bank of such an engine. Obviously, those skilled in the art will readily understand how the invention can be employed with engines having a wide variety of cylinder numbers and cylinder configurations than to those already mentioned.

The cylinder head 11 is formed with a lower sealing surface 15 that is adapted to be brought into engagement with either an upper surface of the cylinder block 12 or cylinder head gasket 16 that is positioned therebetween so as to provide a seal around the peripheral edge of the cylinder bore 13.

This surface 15 is formed with individual combustion chamber recesses 17 which cooperate with the cylinder bore 13 so as to form the combustion chambers 14. These combustion chambers 14 are completed by pistons (not shown) that reciprocate in the cylinder bores 13 along their cylinder bore axes CB. As may be seen best in FIG. 1, the cylinder head combustion chamber recess 17 may be generally symmetrically formed around the cylinder bore axis CB.

The invention has particular utility in conjunction with engines that have multiple valves per cylinder and in the illustrated embodiment, a four-valve per cylinder configuration is employed. This embodies a pair of intake valves 18 that cooperate with an intake passage arrangement, to be described, so as to control the flow of the air charge into the combustion chamber recesses 14. A pair of exhaust valves 19 cooperate with an exhaust passage arrangement formed in the cylinder head 11 so as to control the flow of discharge of burnt combustion products from the combustion chambers 14. The intake valves 18 and exhaust valves 19 are operated by a suitable valve actuating mechanism which appears partially in FIGS. 3 and 4 and will be described by reference thereto.

The intake valves 18 have valve stems 21 that are supported within the cylinder head 15 by valve guides (not shown) and are urged by coil compression springs 22 that act against keeper retainer assemblies fixed to their upper ends for urging these intake valves 18 to their closed positions. The opposite ends of the valve springs 22 engage machine surfaces 23 of the cylinder head 15 so as to complete this closing biasing action.

The intake valves 18 are opened by means of a valve actuating mechanism that is operated by an overhead mounted intake camshaft which is not shown, but which has journal portions that are rotatably journaled within bearing surfaces 24 formed in the cylinder head 15. Bearing caps (not shown) cooperate with the cylinder head bearing surfaces 24 so as to complete the journaling of the intake camshaft.

Although it does not appear in the figures, the illustrated construction can be utilized with direct or thimble tappet operated valves, although other types of valve actuating mechanisms may be employed. However, the positioning of the valve actuating mechanism including the camshaft journaled in the cylinder head bearing surfaces 24 and the orientation of the valve stems 21 is important because it dictates in part the configuration of the intake passages, as will become apparent shortly.

In a manner quite similar to the intake valves 18, the exhaust valves 19 are also operated by means of an overhead mounted exhaust camshaft, which also is not shown in the figures. To this end, the exhaust valves have valve stems 25 which are also slidably supported in the cylinder head 15 by valve guides which are not shown. These exhaust valves 19 are urged to their closed positions by means of coil compression springs 26 that cooperate with keeper retainer assemblies (not shown) fixed to the upper ends of the valve stems 25. The opposite ends of the springs 27 operate against machine surfaces 27 of the cylinder head 15 for urging the exhaust valves 19 to their closed position.

Like the intake valves 18, the exhaust valves 19 are opened by an exhaust camshaft which is not shown, but which is journaled in bearing surfaces 28 formed in the cylinder head 15 on the opposite side of a first, longitudinally extending plane containing the cylinder bore axis CB. This first plane also intersects the axis of rotation of the crankshaft which is not shown and which is driven by the reciprocation of the pistons in the cylinder bores 13.

As should be apparent, a number of details of the construction of the associated engine are not illustrated in the drawings. This is because these components can be of any known or conventional type as will be readily apparent to those skilled in the art.

A spark plug well 29 is formed in the cylinder head 11 generally centrally on the cylinder bore axis CB and receives a spark plug 31 which has its spark gap extending generally into the center of the cylinder head recess 17. In the illustrated embodiment, the spark plug well 29 is offset slightly to one side of the aforenoted first plane that contains the axis of the cylinder bore CB and toward the exhaust valves 19. However, the spark gap is basically on the cylinder bore axis CB. The spark plug 31 is fired by a suitable ignition system in connection with any desired timing strategy.

It has been noted that the intake valves 18 valve intake ports and these intake ports are formed by a pair of valve seats 32 (see FIGS. 3 and 4) that are suitably formed in the cylinder head 15. These valve seats 32 may be formed by pressed bonded in, or other types of inserts or may be formed directly in the material of the cylinder head 15 depending upon the materials used and the desired construction.

A pair of intake passages are formed in the cylinder head 11 and terminate at these intake valve seats 32. These intake passages have inlet openings formed in an exterior surface 33 of the cylinder head 11 and which extends generally perpendicular to the sealing surface 15.

As may be best seen in FIG. 1, the intake valves 18 and the valve seats 32 with which they cooperate lie on opposite sides of a second plane that is perpendicular to the first plane that contains the axis of the cylinder bore CB. This second, perpendicular plane is the same plane along which the section line 2—2 is taken in FIG. 1 and thus, bisects the cylinder bore 13 in for and aft directions, while the first plane bisects the cylinder bore in side-to-side relation.

Figure 3:
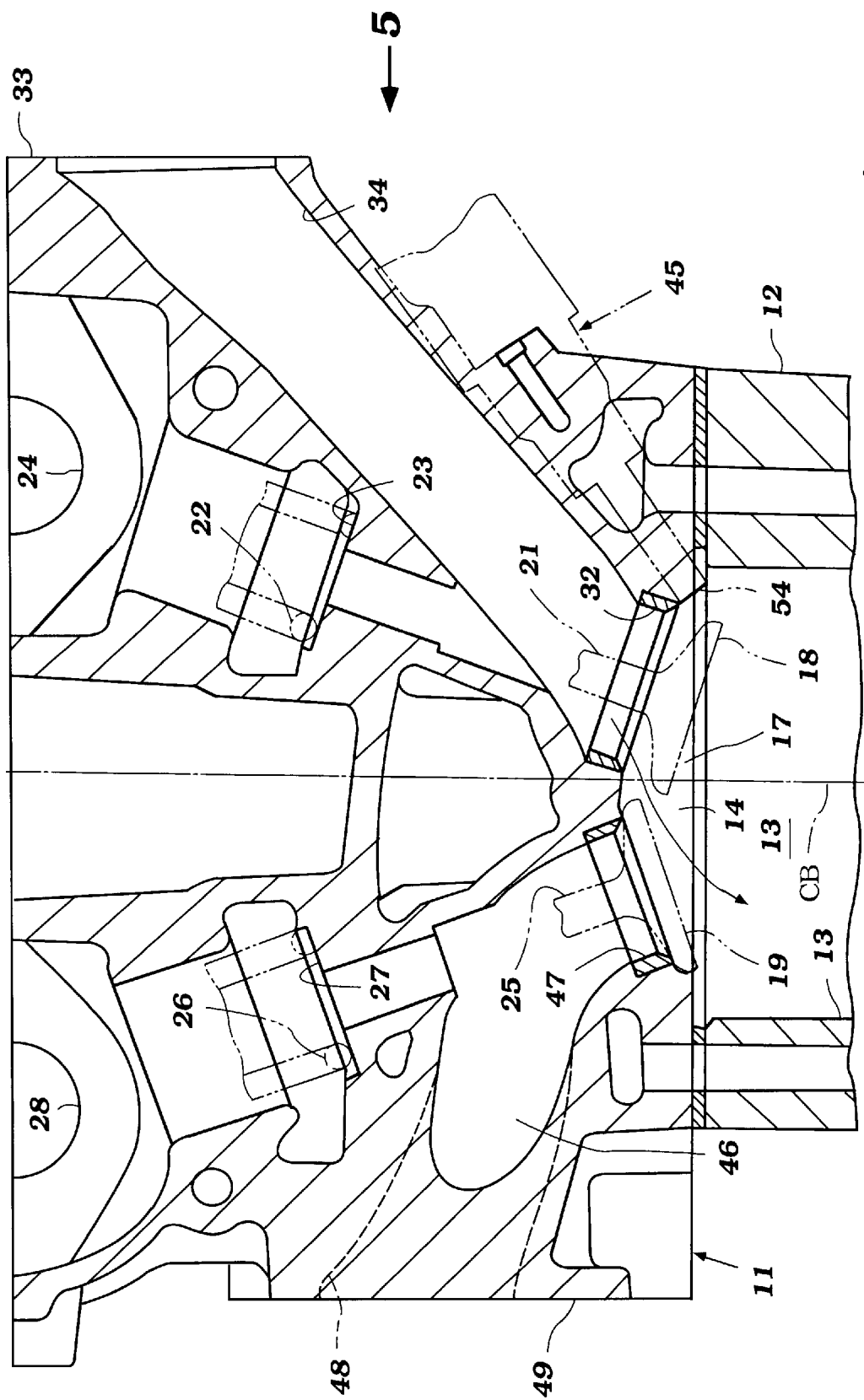
FIG. 3 is a cross-sectional view taken along the line 3—3 of FIG. 1 and is taken along a plane parallel to the plane of FIG. 2, but passing through the center of the secondary intake port.

A first or primary intake passage 34 extends from the cylinder head surface 33 through the cylinder head 11 and terminates at the respective valve seat 32 on one side of the second plane as best seen in FIG. 3. This intake passage 34 is referred to as the primary intake passage because, as will become apparent, it serves the primary air supply for the combustion chamber 14 and supplies an air charge to this combustion chamber under all running conditions.

Figure 4:
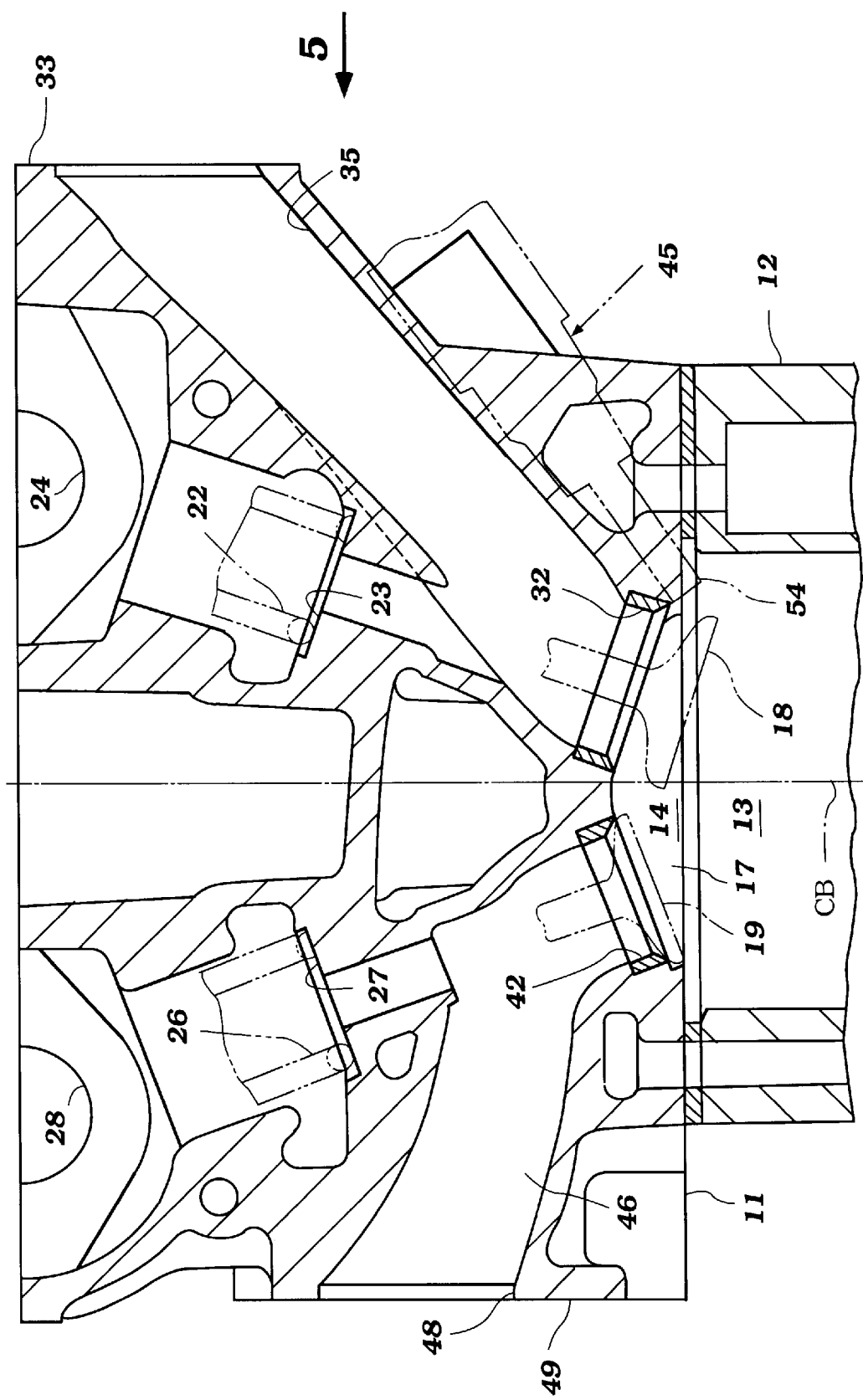
FIG. 4 is a cross-sectional view taken along the line 4—4 of FIG. 1 and is parallel to the planes of FIGS. 2 and 3 and passes through the center of the primary intake port.

On the other hand, a secondary intake passage 35 extends through the cylinder head 11 from the surface 33 and terminates at the remaining intake valve seat 32 on the opposite side of this second plane, this being the valve seat shown in FIG. 4. It should be noted that in the planes of FIGS. 3 and 4, the passages 34 extend basically in parallel, relatively straight configuration to their respective valve seats 32. However, and as seen in FIG. 1, in the surface 33 are staggered relative to the second plane so that they are offset to one end of the cylinder head 11 as best shown in FIG. 1. The reason for this will become apparent shortly.

Figure 5:
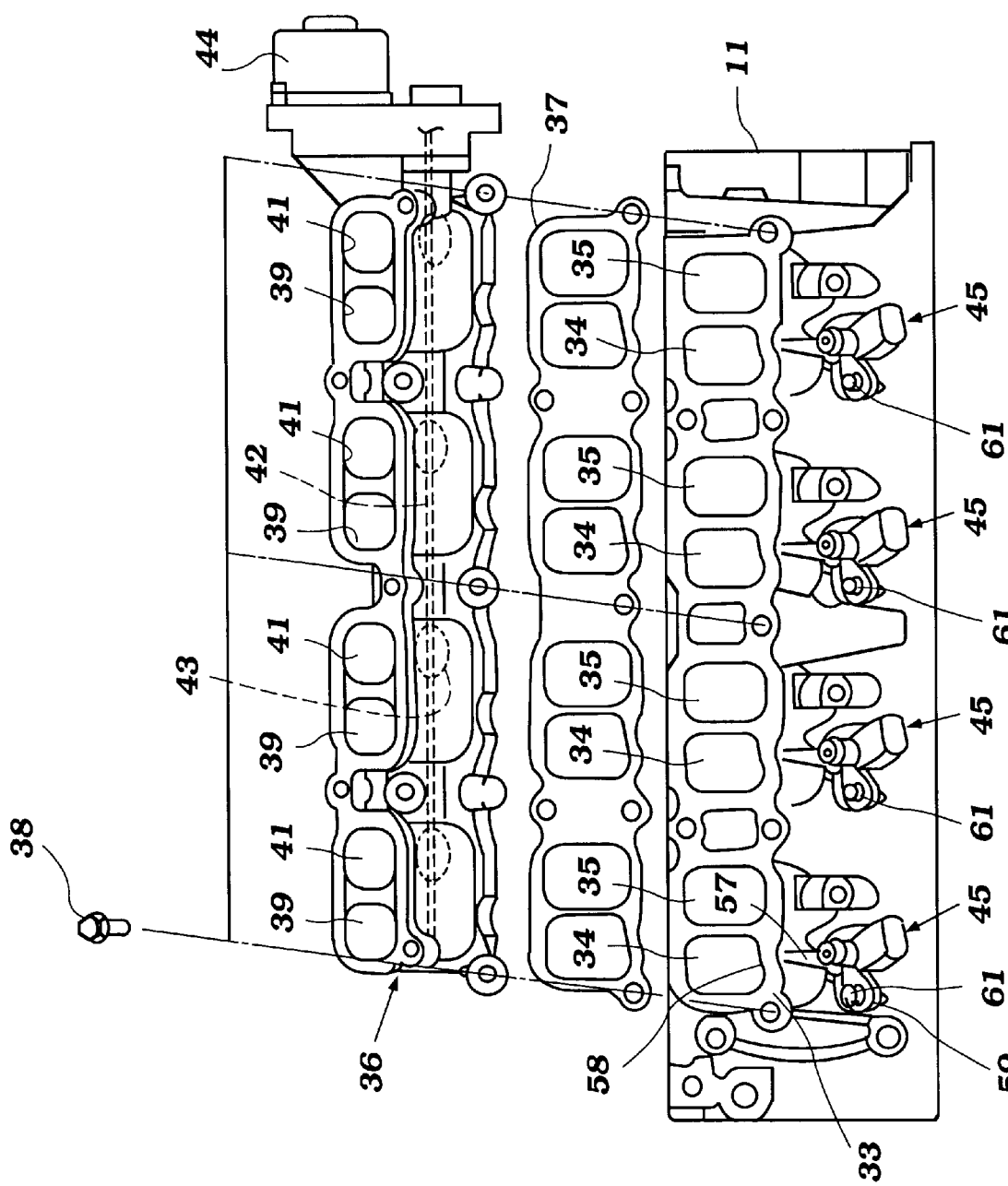
FIG. 5 is an enlarged side elevational view of the cylinder head and is taken looking in the direction of the arrows 5 in each of FIGS. 2–4.

A control valve assembly, seen best in FIGS. 1 and 5, and indicated generally by the reference numeral 36, is affixed to the cylinder head surface 33 with an intervening gasket 37 by a plurality of threaded fasteners, one of which is shown in FIG. 5 and is identified by the reference numeral 38. This control valve body 36 is comprised of pairs of primary and secondary passages 39 and 41, each associated with a respective one of the cylinder bores 13 and specifically the respective combustion chambers 14 formed thereby. The passages 39 and 41 have outlet openings that mate with the inlet openings of the cylinder head passages 34 and 35, respectively.

A control valve shaft 42 is journaled in the control valve body 36 and passes through all of the passage 39 and 41 thereof. Butterfly-type control valves 43 are fixed to the control valve shaft 42 only in the secondary intake passages 41.

The control valve shaft 42 and its control valves 43 are operated by a servomotor 44 (FIG. 5) in accordance with a desired control strategy. Primarily, this control strategy is such that the control valves 43 are maintained in a closed position at idle and off-idle and progressively open as the load and speed on the engine increases above this range.

Because of this, the air flow into the combustion chamber under low and medium ranges will be supplied primarily through the primary intake passage 34 and along one side of the cylinder bore 13. Because of the angular relationship of this passage 34, the charge will be directed in a swirling direction as indicated by the arrow S in FIG. 1. This swirl adds to the turbulence in the combustion chamber and thus improves flame propagation under low speed and mid-range running conditions.

However, as the engine reaches the higher speed ranges, the control valves 43 are opened and then the secondary intake passage 41 and 35 also supply air into the engine. This will tend to reduce the swirling motion and will also provide less flow restriction so that the high speed performance of the engine will not be deteriorated.

A fuel injector, indicated generally by the reference numeral 45, is mounted in the cylinder head 11 in a manner to be described and injects fuel into the combustion chamber 14 at the appropriate timing in accordance with any desired control strategy. This forms a fuel air mixture which is then fired by the spark plug 31 at the appropriate timing. The charge burns and expands and during the exhaust stroke, the exhaust valves will open and the exhaust gases are discharged through an exhaust passage 46 which extends from valve seats 47 that are valved by the exhaust valves 25.

In the illustrated embodiment, the exhaust passage 46 is a Siamese type and has a pair of inlet openings, each of which originate at the respective exhaust valve seats 47. This exhaust passage 46 then terminates in a common discharge opening for each cylinder, indicated at 48 which is formed in an exterior surface 49 of the cylinder head 11. The surface 49 is, in the illustrated embodiment, parallel to the surface 33 but on the opposite side of the first plane that contains the cylinder bore axis CB.

The construction and location of the fuel injector 45 will now be described. These fuel injectors 45 are mounted in fuel injector wells, indicated generally by the reference numeral 51 and which is formed in the cylinder head 15. These openings or wells 51 define a first injector receiving portion 52 that receives the main body of the fuel injectors 45. At its termination, a nozzle port opening 53 is formed, which receives a nozzle portion 54 of the fuel injectors 45.

The axis of the well 51 extends generally parallel to the second plane and actually lies within it as best seen in FIG. 1. Thus, the fuel injectors 45 inject fuel directly toward the center of the combustion chamber and specifically toward the cylinder bore axis CB. As may be seen best in FIGS. 2–4, the fuel injectors 45 extend generally parallel to the intake passages 34 and 35 and below them. This is possible without obstruction because in the area where the primary intake passage 34 extends across the fuel injector, it will be over a smaller diameter portion of it as best seen in FIG. 3 and thus, the configuration of the intake passage 34 can be generally straight with the only curvature being that relative to the second plane as seen in FIG. 1.

Figure 6:
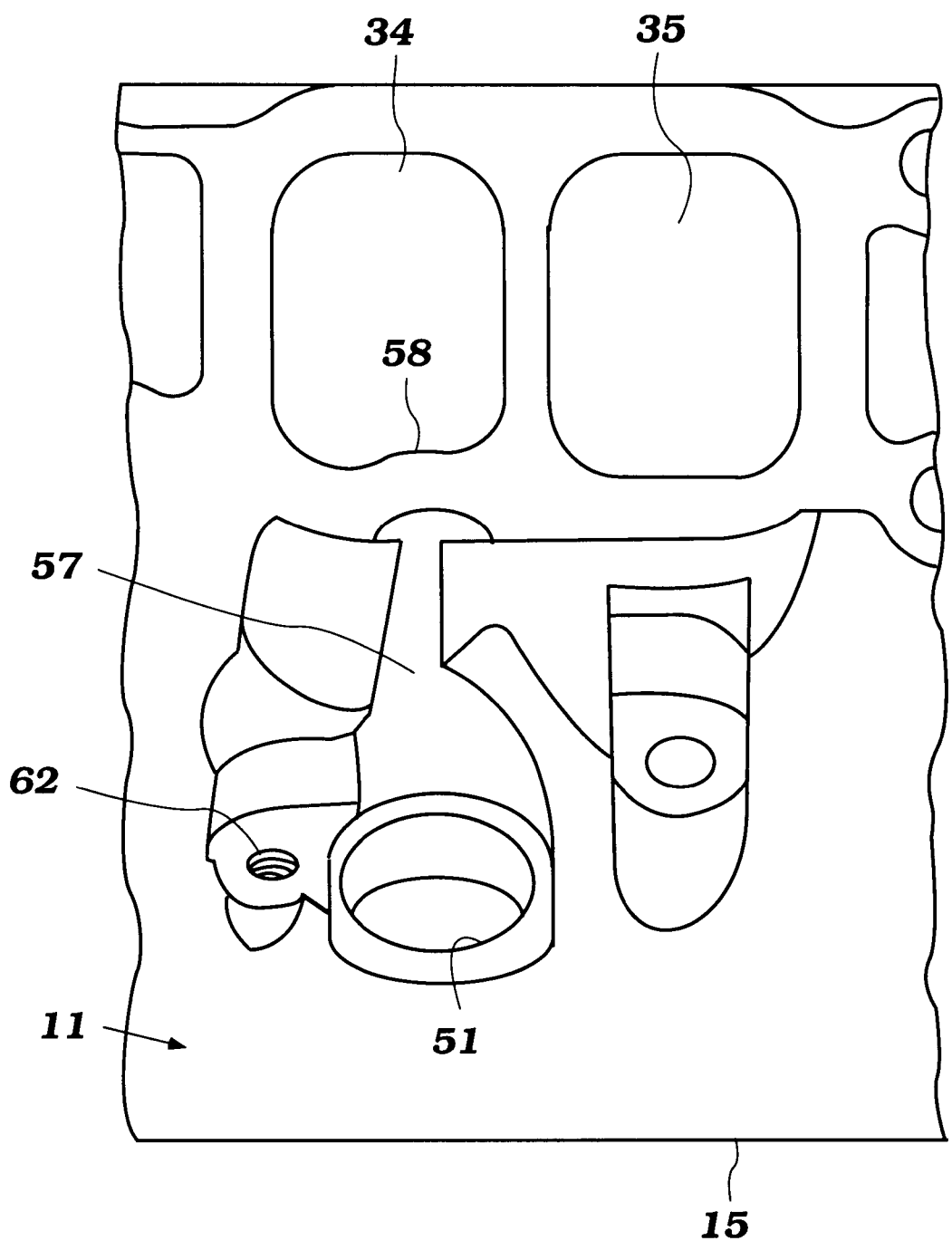
FIG. 6 is an exploded view looking in the same direction as FIG. 5 but on a smaller scale and showing the complete cylinder head assembly, the control valve gasket and the control valve body.

However, this formation offers no restriction to flow and in fact, somewhat aids in the swirl generated thereby. As best seen in FIGS. 5 and 6, the injector well 51 in the cylinder head is joined by a small bridging section 57 to the cylinder head 11 beneath the primary intake passage 34. This results in a small bulge 58 formed in the inlet side of this passage which does not significantly detract from the effective cross-sectional area and does so close to the inlet end so as to permit maximum air flow without necessitating any compromise in the shape of the passage.

As seen in FIG. 5, the injectors 45 are held in place by small retaining clips 59 that are held in place by threaded fasteners 61. These fasteners are threaded into tapped openings 62 (FIG. 6) in the cylinder head 11.

Thus, from the foregoing description, it should be readily apparent that the described cylinder head construction provides adequate space and positioning for all of the components and particularly the fuel injector for the direct injection system without sacrificing flow areas or without creating sharp bends or curvature in the induction system that could restrict breathing capability.

Of course, the foregoing description is that of a preferred embodiment of the invention. Various changes and modifications can be made without departing from the spirit and scope of the invention, as defined by the appended claims.

What is claimed is:

1. A cylinder head for a direct injected internal combustion engine, said cylinder head having a sealing surface that is adapted to be held in sealing engagement with an associated cylinder block, said cylinder head defining with a cylinder bore in the cylinder block a combustion chamber, a combustion chamber portion of said cylinder head sealing surface overlying the cylinder bore and defines at least a pair of valve seats on the same side of a first plane that extends through the axis of said cylinder bore, a pair of flow passages formed in said cylinder head each extending from a respective opening in a common outer side surface of said cylinder head to respective of said valve seats, and a fuel injector receiving opening formed in one side of said cylinder head and opening through said common outer side surface and terminating in a discharge nozzle opening that communicates with the cylinder head combustion chamber portion of said cylinder head sealing surface, said fuel injector receiving opening having its center lying on a second plane that is perpendicular to said first plane and which also contains said cylinder bore axis, said fuel injector receiving opening being disposed beneath said flow passages at said one side of said cylinder head, said fuel injector receiving opening extending to said common cylinder head outer side surface, each of said flow passages being inclined at a respective acute angle to said second plane from said common cylinder head side surface to its termination at the respective valve seat so that fuel injector receiving opening is cleared without requiring sharp curvatures or substantial reduction in the flow area of said flow passage, one of said flow passages being inclined toward said fuel injector receiving opening and overlying said fuel injector receiving opening in the area of its opening in said common cylinder head side surface.

2. A cylinder head for a direct injected internal combustion engine as set forth in claim 1 wherein the passage serving the other of the pair of valve seats on the one side of the first plane is inclined away from the fuel injector receiving opening and to reduce the amount it overlies said fuel injector receiving opening.

3. A cylinder head for a direct injected internal combustion engine as set forth in claim 1 wherein the pair of valve seats on the one side of said cylinder head are intake valve seats and their respective passages comprise intake passages.

4. A cylinder head for a direct injected internal combustion engine as set forth in claim 3 further including a control valve affixed to the cylinder head surface in which the intake passage openings are formed, said control valve having first and second passages each serving a respective one of said cylinder head intake passages and a control valve element in one of said control valve passages for restricting the flow therethrough so that the other of said control valve passages and said cylinder head intake passages form a primary intake passage arrangement.

5. A cylinder head for a direct injected internal combustion engine as set forth in claim 4 wherein the intake passage serving the other of the pair of intake valve seats is inclined away from the fuel injector receiving opening to minimize the amount it overlies said fuel injector receiving opening.

6. A cylinder head for a direct injected internal combustion engine as set forth in claim 5 wherein the intake passage serving the other of the pair of intake valve seats forms a portion of the primary intake passage arrangement.

7. A cylinder head for a direct injected internal combustion engine as set forth in claim 6 wherein the primary intake passage arrangement is configured to generate a swirl in the combustion chamber.

\* \* \* \* \*

UNITED STATES PATENT AND TRADEMARK OFFICE
CERTIFICATE OF CORRECTION

PATENT NO.    : 6,367,444 B1
DATED         : April 9, 2002
INVENTOR(S)   : Minoru Yonezawa et al.

It is certified that error appears in the above-identified patent and that said Letters Patent is hereby corrected as shown below:

<u>Column 8,</u>
Line 1, delete "requiting" and insert -- requiring --.

Signed and Sealed this

Ninth Day of July, 2002

Attest:

Attesting Officer

JAMES E. ROGAN
*Director of the United States Patent and Trademark Office*